United States Patent
Chen et al.

(10) Patent No.: US 8,958,485 B2
(45) Date of Patent: Feb. 17, 2015

(54) METHOD AND SYSTEM FOR PROVIDING SELECTED LAYERED VIDEO SERVICE VIA A BROADBAND GATEWAY

(75) Inventors: Xuemin Chen, Rancho Santa Fe, CA (US); Jeyhan Karaoguz, Irvine, CA (US); Wael William Diab, San Francisco, CA (US); David Garrett, Tustin, CA (US); David Albert Lundgren, Mill Valley, CA (US); Rich Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 316 days.

(21) Appl. No.: 12/982,340

(22) Filed: Dec. 30, 2010

(65) Prior Publication Data

US 2011/0299606 A1  Dec. 8, 2011

Related U.S. Application Data

(60) Provisional application No. 61/351,696, filed on Jun. 4, 2010.

(51) Int. Cl.
| | |
|---|---|
| H04N 7/12 | (2006.01) |
| H04L 7/00 | (2006.01) |
| H04N 7/16 | (2011.01) |
| H04L 29/06 | (2006.01) |
| H04L 29/08 | (2006.01) |

(52) U.S. Cl.
CPC .............. *H04L 65/102* (2013.01); *H04L 29/08* (2013.01); *H04L 65/4015* (2013.01); *H04L 65/4069* (2013.01); *H04L 65/602* (2013.01); *H04L 65/607* (2013.01); *H04L 65/80* (2013.01); *H04L 65/4007* (2013.01); *H04L 67/303* (2013.01)
USPC ....... 375/240.26; 375/356; 725/110; 725/114

(58) Field of Classification Search
USPC ........................... 375/240, 356; 725/110, 114
See application file for complete search history.

(56) References Cited

U.S. PATENT DOCUMENTS

| | | | |
|---|---|---|---|
| 8,406,241 B2 * | 3/2013 | Ansari ........................... | 370/401 |
| 2006/0158509 A1 * | 7/2006 | Kenoyer et al. ............. | 348/14.08 |
| 2007/0160126 A1 * | 7/2007 | Van Der Meer et al. ....... | 375/240 |
| 2009/0074051 A1 * | 3/2009 | Manapragada et al. ....... | 375/240 |
| 2010/0202453 A1 * | 8/2010 | Martinez Bauza et al. ... | 370/390 |

* cited by examiner

*Primary Examiner* — Dave Czekaj
*Assistant Examiner* — Tsion B Owens
(74) *Attorney, Agent, or Firm* — Foley & Lardner LLP

(57) ABSTRACT

A broadband gateway, which that enables communication with a plurality of devices, handles at least one physical layer connection to at least one corresponding network access service provider. The broadband gateway may identify video layer information required for a layered video service based on video decoding capabilities and/or power profiles for the devices. The identified video layer information, comprising number of required layers and corresponding video formats such as 720P60, 1080i60 and/or 1080P60, may be communicated to the at least one network access service provider. A base layer video and one or more enhancement layer videos, generated via scalable coding based on the communicated identified video layer information, may be received from the at least one corresponding network access service provider. The received base layer video and enhancement layer videos are selectively provided to the devices for the requested layered video service based on the corresponding video decoding capabilities and/or power profiles.

21 Claims, 5 Drawing Sheets

METHOD AND SYSTEM FOR PROVIDING SELECTED LAYERED VIDEO SERVICE VIA A BROADBAND GATEWAY

CLAIM OF PRIORITY

This patent application makes reference to, claims priority to and claims benefit from U.S Provisional Patent Application Ser. No. 61/351,696 filed on Jun. 4 2010.

The above stated application is hereby incorporated herein by reference in its entirety.

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/981,414 filed on Dec 29, 2010; and
U.S. patent application Ser. No. 12/981,733 filed on Dec. 30, 2010;

Each of the above stated applications is hereby incorporated herein by reference in its entirety.

FIELD OF THE INVENTION

Certain embodiments of the invention relate to broadband gateways. More specifically, certain embodiments of the invention relate to a method and system for providing selected layered video service via a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing selected layered video service via a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing selected layered video service via a broadband gateway. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections corresponds to a respective one of the plurality of corresponding access service providers. The broadband gateway may identify video layer information required for a layered video service based on video decoding capabilities and/or power profiles of the devices. The identified video layer information may comprise a number of required layers and corresponding video formats such as 720P60, 1080i60 and/or 1080P60. The identified video layer information may be communicated to the at least one network access service provider. A base layer video and one or more enhancement layer videos, determined based on the communicated identified video layer information, may be received from the at least one network access service provider for the layered video service. The received base layer video and enhancement layer videos may be selectively provided to the devices based on the corresponding video decoding capabilities and/or power profiles. Scalable coding may be performed by the at least one network access service provider to generate the base layer video and the enhancement layer videos required for the layered video service. The broadband gateway may selectively provide the generated base layer video and enhancement layer videos to the devices based on the corresponding video decoding capabilities and/or power profiles for the layered video service.

Figure 1:
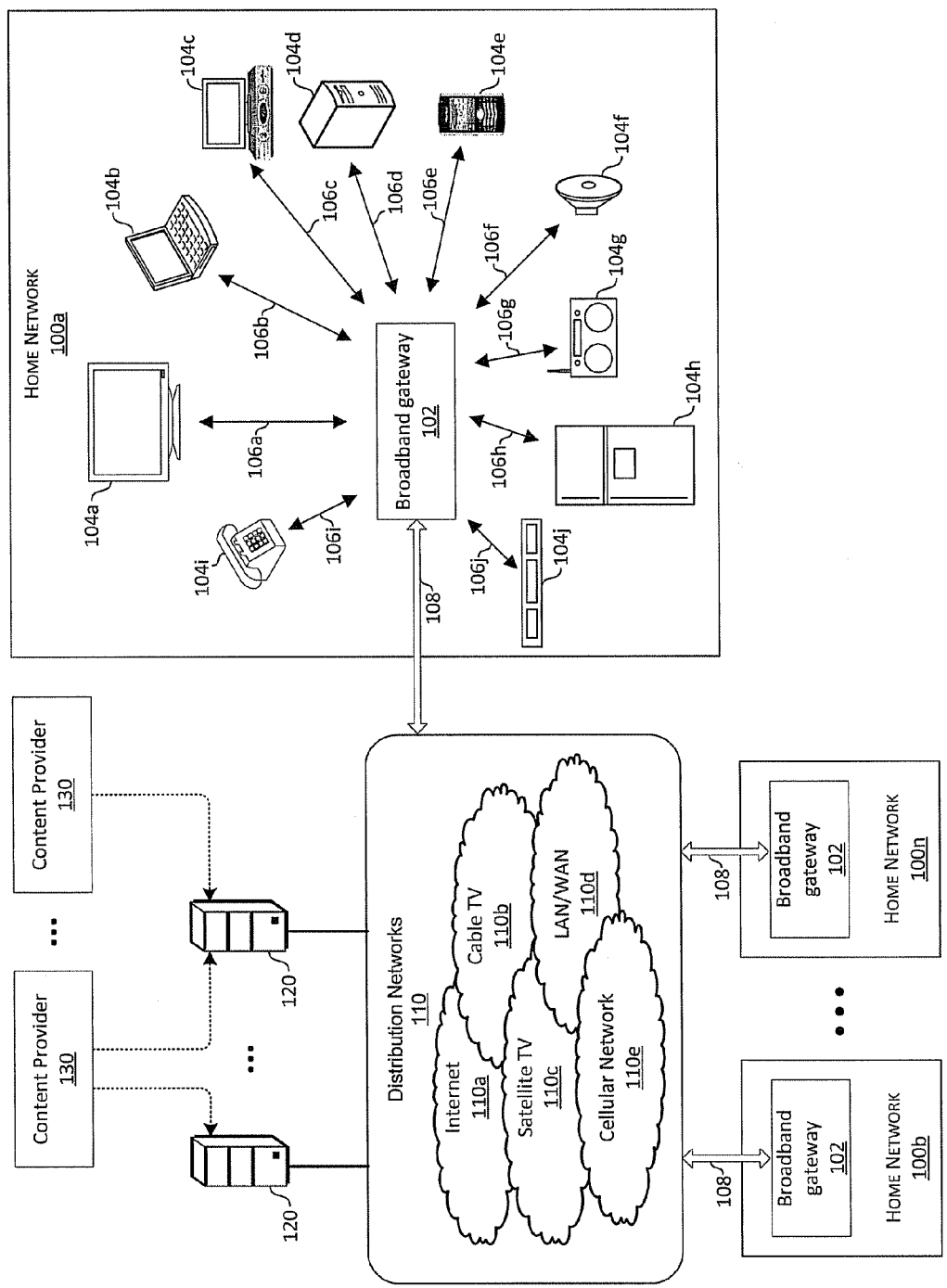
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. Also shown in FIG. 1 are additional home networks 100b, . . . , 100n. Each of the home networks 100b, . . . , 100n may also be serviced by a broadband gateway 102.

The service providers 120 may comprise various entities which may provide various services using different access technologies to devices 104 via the gateway 102 and/or to the gateway 102 itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed line 106, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single broadband gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections provided by multiple network access service providers.

The broadband gateway 102 may also be operable to provide and/or support various other, non-content related services in the home network 100. For example, the broadband gateway 102 may be operable to provide energy management in the home network 102, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, may communicate only the broadband gateway 102 as shown, the invention may not be so limited. Accordingly, the devices 104a-104j, may communicate with multiple broadband gateways in a local or home network without departing from the spirit and scope of various embodiments of the invention.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, one or more of the devices 104a-104e may request that video content of a layered video service be delivered to it via the broadband gateway 102. A layered video service may comprise a base layer video and a plurality of enhancement layer videos.

In an embodiment of the invention, the broadband gateway 102 may be operable to identify or discover corresponding video decoding capabilities and/or power profiles for the requesting devices 104a-104e. A power profile may comprise device power usage information at various time intervals. Video decoding capabilities may comprise information such as video compression formats and frame rates supported by the corresponding requesting devices 104a-104e. Depending on applications, content for the requested layered video service may be compressed or encoded in various video formats such as 720p, 1080i and/or 1080p, at various frame rates such as 30 or 60 frames per second. For example, in MPEG-2 standard, content of a layered video service may be encoded in 1080i format at rate of 30 frames per second, that is, 1080i30. In high definition TV, content of a layered video service may be encoded in 1080i or 1080P format at rate of 60 frames per second, 1080i60 or 1080P60.

In an embodiment of the invention, the broadband gateway 102 may be operable to determine number of required layers and corresponding video formats for the requested layered video service based on corresponding video decoding capabilities and/or power profiles identified for the requesting devices 104a-104e. In this regard, the required layer videos may comprise a base layer video and one or more enhancement layer videos for the requested layered video service. The required layer videos may be in different video formats. For example, the base layer video may be a 720p60 video. One or more of the required enhancement layer videos may be 1080P60 videos. In addition, the base layer video may be supported or decodable by each of the requesting devices 104a-104e. However, the enhancement layer videos may be selectively supported or decodable by the requesting devices 104a-104e based on the corresponding identified video decoding capabilities and/or power profiles. The determined number of required layers and corresponding video formats for the requested layered video service may be communicated, as video layer information for the requested layered video service, to the service providers 120.

In an embodiment of the invention, the service providers 120 may be operable to receive video layer information from the broadband gateway 102 for a layered video service requested by the devices 104a-104e. The service providers 120 may perform scalable coding for the requested layered video service based on the received video layer information. The resulting base layer video and one or more enhancement layer videos may be communicated to the broadband gateway 102 via the distribution networks 110.

In an embodiment of the invention, the broadband gateway 102 may be operable to receive, from the service providers 120, a base layer video and one or more enhancement layer videos for a layered video service requested by the devices 104a-104e. The broadband gateway 102 may selectively communicate or distribute the received layered videos to the requesting devices 104a-104e based on corresponding decoding capabilities and/or power profiles.

Figure 2A:
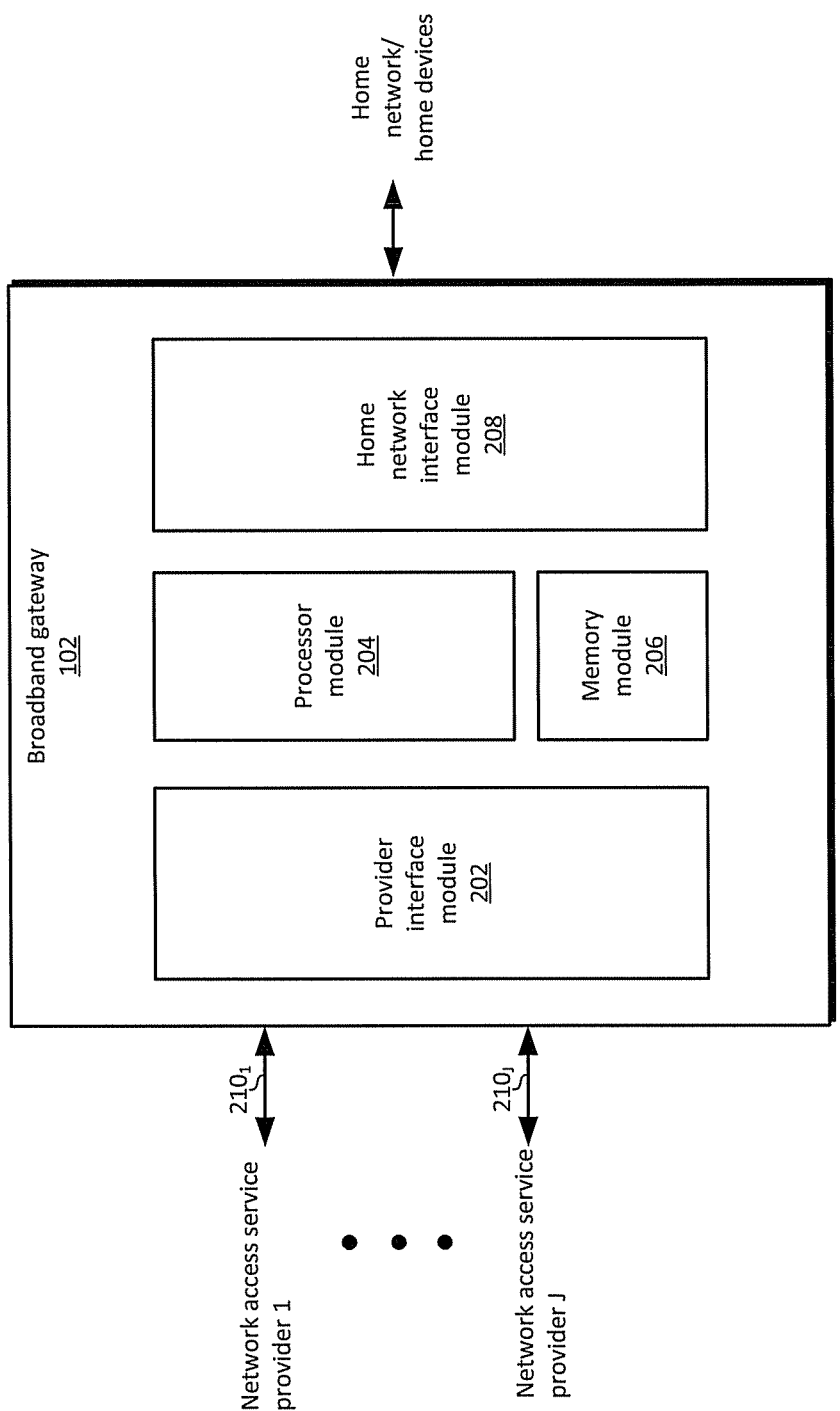
FIG. 2A is a diagram illustrating an exemplary broadband gateway, which may be operable to select and provide a layered video service for devices with various decoding capabilities, in accordance with an embodiment of the invention.

FIG. 2A is a diagram illustrating an exemplary broadband gateway, which may be operable to select and provide a layered video service for devices with various decoding capabilities, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j. In instances where a layered video service is requested by the devices 104a-104e served by the broadband gateway 102, the broadband gateway 102 may be operable to identify or determine video layer information, comprising number of required layers and corresponding video formats, for the requested layered video service. The video layer information may be determined based on decoding capabilities and/or power profiles of the corresponding requesting devices 104a-104e. The broadband gateway 102 may communicate the identified video layer information to the service providers 120 and/or the content providers 130 for the requested layered video service. The service providers 120 and/or the content providers 130 may perform scalable coding for the requested layered video service based on the received video layer information. The resulting base layer and enhancement layer videos may be provided to the broadband gateway 102 via the distribution networks 110. The broadband gateway 102 may selectively distribute or provide the base layer and enhancement layer videos received from the service providers 120 and/or the content providers 130 to the requesting devices 104a-104e according to corresponding decoding capabilities and/or power profiles.

The broadband gateway 102 may communicate with the various devices via a home network that may comprise wired and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

Customized graphical user interfaces (GUIs) may be generated by the broadband gateway 102, wherein the GUIs may be used to visually display and/or provide interaction with the customized content.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a home network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 130 to one or more network access service providers. In this regard, each of the physical layer connections $130_1$-$130_j$ may connect the gateway 110 to a difference network access service provider. Each of the physical layer connections 130 may comprise a wired, optical, or wireless connection. Each of the physical layer connections 130 may utilize different physical media and/or different physical layer protocols. For example, the connection $130_1$ may comprise a DSL over twisted-pair connection and the connection $130_j$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more physical layer connections $210_1$-$210_j$ may be processed to make it suitable for communication to a device such as the device 104a and data from the one or more devices 104 may be processed to make it suitable for communication to the service/content providers via one or more physical layer connections $210_1$-$210_j$. In this regard, the processor module 204 may comprise one or more portions that are suitable to handle communication or interactions between the plurality of service providers 120 and/or the plurality of content providers 130, and the devices 104a-104e. For example, in instances where the devices 104a-104e request a layered video service provided by the service providers 120 and/or the content providers 130, the processor module 204 may identify or discover video decoding capabilities and/or power profiles for the corresponding requesting devices 104a-104e. Video layer information may be determined for the requested layered video service based on the identified video decoding, capabilities and/or power profiles for the corresponding devices 104a-104e. The determined video layer information may comprise information such as number of required layer and corresponding video formats for the requested layered video service. The processor module 204 may be operable to communicate the determined video layer information to the service providers 120 and/or the content providers 130 via the provider interface module 202. The processor module 204 may then receive, via the provider interface module 202, requested base layer and enhancement layer videos over the physical layer connections $210_1$-$210_j$ from the service providers 120 and/or the content providers 130. The processor module 204 may be operable to selectively provide the received base layer and enhancement layer videos to the requesting devices 104a-104e, via the home network interface module 208, based on corresponding video decoding capabilities and/or power profiles.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102. The GUI may be a web-based interface, and a user may interact with it via a computer and web browser. The GUI may be customized based on characteristics of the broadband gateway 102, the device 104 coupled to the broadband gateway 102, and the service and/or content providers associated with the broadband gateway 102. The processors module 204 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, a request for content may be received from a device 104 via the home network interface module 208 and the processor module 204 may determine whether to grant the request. In instances that the request is granted, the processor module 204 may manage communication between the service providers 120 and/or the content providers 130, and the devices 104a-104e. In instances where a layered video service is requested by the devices 104a-104e, the processor module 204 may be configured to identify video decoding capabilities and/or power profiles for the corresponding requesting devices 104a-104e to determine video layer information required for the requested layered video service. The video layer information may comprise information such as number of required (video) layers and corresponding video formats. In this regard, the required number of layer videos may comprise one base layer video and one or more enhancement layer videos. The base layer video may be supported or decodable by each of the requesting devices 104a-104e. The enhancement layer videos may be selectively supported or decodable by the requesting devices 104a-104e based on corresponding decoding capabilities and/or power profiles.

The video layer information may be communicated to the service providers 120 and/or the content providers 130 via the provider interface module 202. The processor module 204 may receive requested base layer and enhancement videos from the service providers 120 and/or the content providers 130 via the provider interface module 202. The processor module 204 may selectively distribute or communicate the received base layer and enhancement layer videos to the requesting devices 104a-104e via the home network interface module 208 based on corresponding video decoding capabilities and/or power profiles.

Figure 2B:
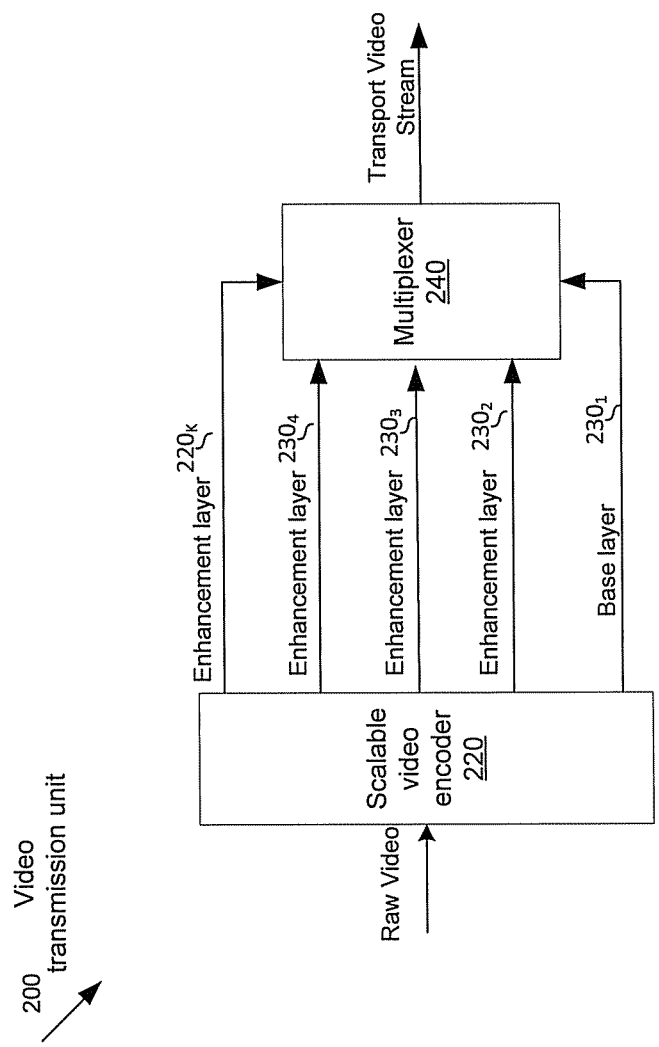
FIG. 2B is a diagram illustrating an exemplary video transmission unit that is operable to provide a layered video stream, in accordance with an embodiment of the invention.

FIG. 2B is a diagram illustrating an exemplary video transmission unit that is operable to provide a layered video stream, in accordance with an embodiment of the invention. Referring to FIG. 2B, there is shown a video transmission unit 200. The video transmission unit 200 comprises a scalable video encoder 220 and a multiplexer 240.

The scalable video encoder 220 may comprise suitable logic, circuitry, interfaces and/or code that may be operable to encode a raw video into a plurality of (compressed) layers comprising a base layer video $230_1$ and one or more enhancement layer video $230_2$-$230_K$. The base layer video $230_1$ may be independently decoded and provide the basic video quality. The enhancement layer videos $230_2$-$230_K$ may be decoded together with the base layer video $230_1$ and may provide refinement data to the base layer video $230_1$ to increase the video quality. In instances where a request for a layered video service is received from the broadband gateway 102, for example, the scalable video encoder 220 may perform scalable coding on a corresponding raw video for the requested layered video service. In an embodiment of the invention, the received service request may comprise video layer information such as the number of required layers and the corresponding video formats by the broadband gateway 102. In this regard, the scalable video encoder 220 may perform scalable coding for the requested layered video service based on the received video layer information. The resulting base layer video $230_1$ and the enhancement layer videos $230_2$-$230_K$, as required by the broadband gateway 102, may be provided or communicated to the multiplexer 240.

The multiplexer 240 may comprise suitable logic, circuitry, interfaces and/or code that may be operable to merge or combine a plurality of video streams into a single compound video stream, namely a transport video stream, for transmission. The transport video stream may comprise the base layer video $230_1$ and the enhancement layer videos $230_2$-$230_K$.

In an exemplary operation, the video transmission unit 200 may receive a request from the broadband gateway 102 for a layered video service. The received request may comprise video layer information such as number of required layers and compression format for each layer that are required by the broadband gateway 102. In this regard, the scalable video encoder 220 may encode a corresponding raw video into a base layer video $230_1$ and enhancement layer videos $230_2$-$230_K$ according to the received video layer information. The resulting base layer video $230_1$ and the enhancement layer videos $230_2$-$230_K$ may be combined into a single transport video stream. The video transmission unit 200 may transmit or communicate the transport video stream to the broadband gateway 102 over the distribution networks 110.

Figure 3:
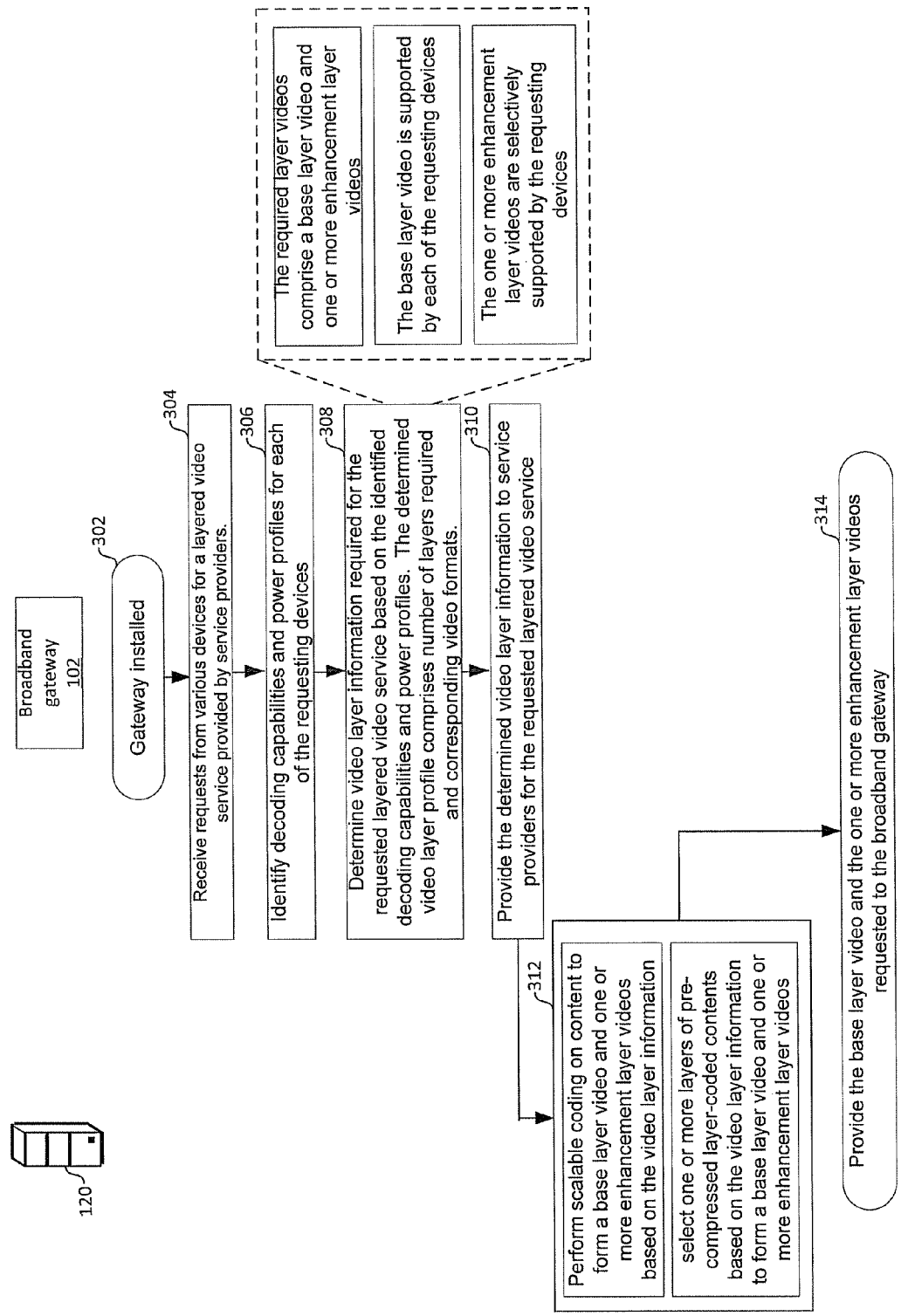
FIG. 3 is a flow chart illustrating exemplary steps that may be performed by a broadband gateway to signal service providers for selecting a layered video service for devices with various decoding capabilities, in accordance with an embodiment of the invention.

FIG. 3 is a flow chart illustrating exemplary steps that may be performed by a broadband gateway to signal service providers for selecting a layered video service for devices with various decoding capabilities, in accordance with an embodiment of the invention. Referring to FIG. 3, the exemplary steps may begin with step 302, in which a broadband gateway 102 may be installed to interface with the devices 104 and the service/content providers via the distribution network(s) 110. In step 304, the broadband gateway 102 may receive requests from the devices 104 for a layered video service provided by the content providers 130 and/or the service providers 120. In step 306, the broadband gateway 102 may be operable to identify decoding capabilities and/or power profiles for each of the devices 104. In step 308, the broadband gateway 102 may determine video layer information required for the requested layered video service based on the identified decoding capabilities and/or power profiles. The determined video layer information comprises number of required layers and corresponding video formats such as 720P60 and 1080i60. In this regard, the required layer videos comprise a base layer video, and one or more enhancement layer videos. The base layer video may be supported by each of the devices 104. The enhancement layer videos may be selectively supported by the devices 104 depending on the corresponding decoding capabilities and/or power profiles.

In step 310, the broadband gateway 102 may provide the determined video layer information to the content providers 130 and/or the service providers 120 for the requested layered video service. In step 312, the content providers 130 and/or the service providers 120 may be operable to perform scalable coding on related content to form or generate the base layer video and one or more enhancement layer videos based on the video layer information. Alternatively, instead of performing scalable coding real-time, the content providers 130 and/or the service providers 120 may also be operable to select one or more layers of pre-compressed layer-coded contents based on the video layer information to form a base layer video and one or more enhancement layer videos for the broadband gateway 102. In step 314, the content providers 130 and/or the service providers 120 may provide or communicate the base layer video and the one or more enhancement layer videos to the broadband gateway 102 over the physical layer connections $210_1$-$210_J$.

Figure 4:
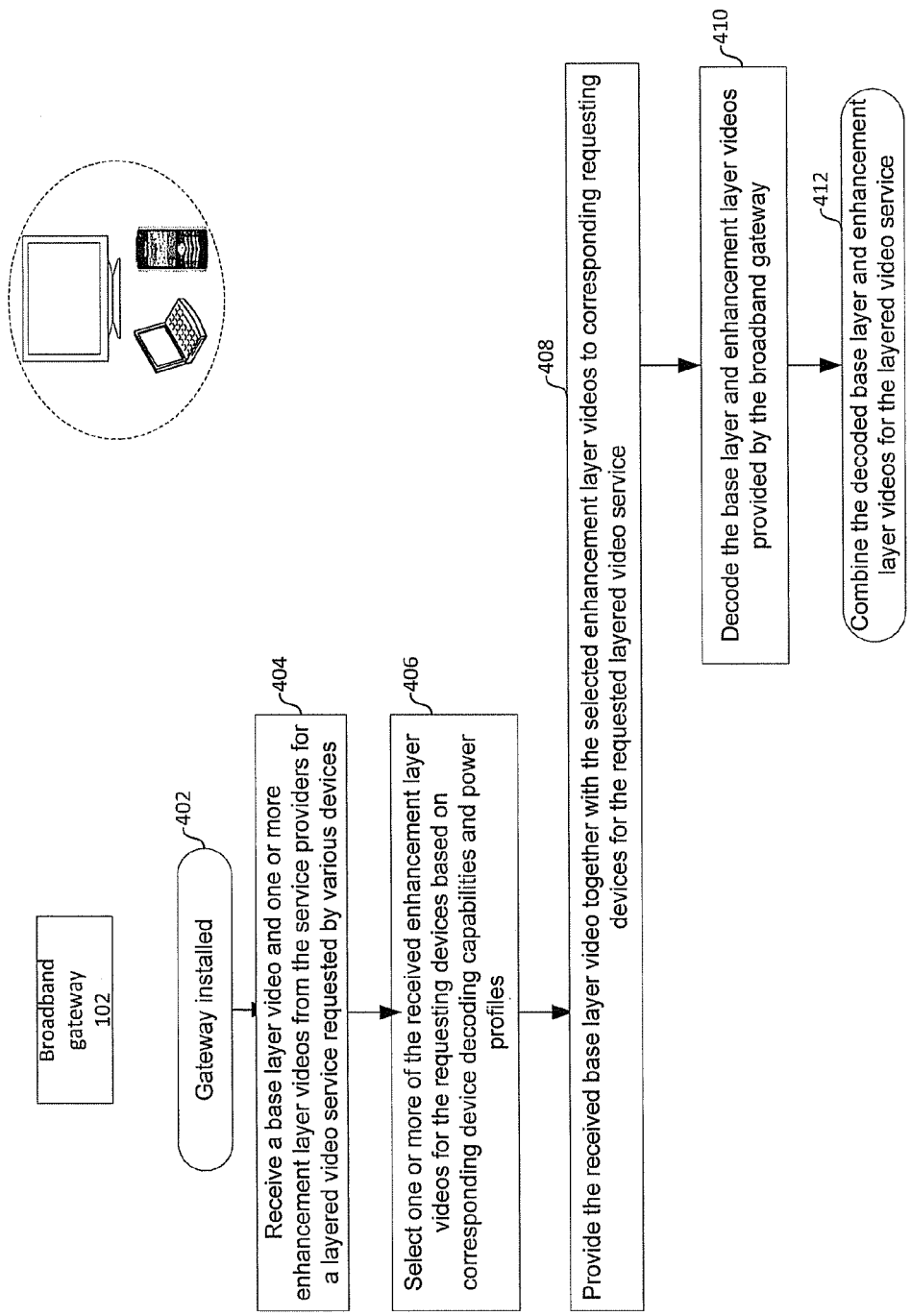
FIG. 4 is a flow chart illustrating exemplary steps that may be performed by a broadband gateway to provide a selected layered video service for devices with various decoding capabilities, in accordance with an embodiment of the invention.

FIG. 4 is a flow chart illustrating exemplary steps that may be performed by a broadband gateway to provide a selected layered video service for devices with various decoding capabilities, in accordance with an embodiment of the invention. Referring to FIG. 4, the exemplary steps may begin with step

402, in which a broadband gateway 102 may be installed to interface with the devices 104 and the service/content providers via the distribution network(s) 110. In step 404, the broadband gateway 102 may receive a base layer video and one or more enhancement layer videos over the physical layer connections $210_1$-$210_J$ from the content providers 130 and/or the service providers 120 for a layered video service requested by the devices 104. In step 406, the broadband gateway 102 may be operable to select one or more of the received enhancement layer videos for the devices 104 based on corresponding device decoding capabilities and/or power profiles. In step 408, the broadband gateway 102 may provide the received base layer video together with the selected enhancement layer videos to corresponding requesting devices for the requested layered video service. In step 410, the devices 104 may be operable to decode the base layer video and the corresponding enhancement layer videos provided by the broadband gateway 102. In step 412, the devices 104 may combine the corresponding decoded layer videos for the requested layered video service.

Various aspects of a method and system for providing selected layered video service via a broadband gateway are provided. In various exemplary embodiments of the invention, a broadband gateway 102, which enables communication with a plurality of devices 104, is operable to handle at least one physical layer connection to at least one corresponding network access service provider. The at least one physical layer connection may comprise a plurality of physical layer connections such as the physical layer connections $210_1$-$210_J$ and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102 may be operable to identify video layer information required for a layered video service based on video decoding capabilities and/or power profiles of the devices 104. The identified video layer information may comprise a number of required layers and corresponding video formats such as 720P60, 1080i60 and/or 1080P60. The broadband gateway 102 may be operable to communicate the identified video layer information to the at least one network access service provider. A base layer video and one or more enhancement layer videos, which are determined based on the communicated identified video layer information, may be received for the layered video service from the at least one network access service provider.

The broadband gateway 102 may selectively provide the received base layer video and the received one or more enhancement layer videos to the devices 104 based on the corresponding video decoding capabilities and/or power profiles. The at least one network access service provider may perform scalable coding to generate the base layer video and the enhancement layer videos required for the layered video service based on the communicated video layer information. In this regard, the generated base layer video may be decodable by the devices 104. The generated enhancement layer videos may be selectively decodable by the devices 104. The generated base layer video and enhancement videos may be communicated to the broadband gateway 102 over the corresponding physical layer connections to the at least one network access service provider. The broadband gateway 102 may be operable to select the enhancement layer videos for the devices 104 based on the corresponding video decoding capabilities and/or power profiles. The selected enhancement layer videos and the base layer video may be provided or transmitted to the corresponding devices 104 to be decoded for the layered video service.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for providing selected layered video service via a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking in a broadband gateway that enables communication with a plurality of devices, wherein the broadband gateway is operable to handle at least one physical layer connection to at least one corresponding network access service provider, the broadband gateway comprising a provider interface module, the method comprising:
receiving a request for a layered video service from the devices;
identifying, by the broadband gateway, video layer information required for the layered video service requested by the devices, the video layer information being based on video decoding capabilities or power profiles of the plurality of devices;
communicating, by the broadband gateway, the identified video layer information to the at least one network access service provider via the provider interface module, the identified video layer information comprising an indication of enhancement layer videos;
receiving, from the at least one network access service provider, a base layer video and the enhancement layer videos for the layered video service, wherein the base layer video and the enhancement layer videos are determined based on the communicated identified video layer information; and selectively providing, by the broadband gateway, the received base layer video and a subset of the received enhancement layer videos to an individual one of the plurality of devices based on respective video decoding capabilities or a power profile of the individual one of the plurality of devices.

2. The method of claim 1, wherein the at least one physical layer connection comprises a plurality of physical layer connections and the at least one corresponding network access service provider comprises a plurality of corresponding access service providers, and wherein each of the plurality of physical layer connections corresponds to a respective one of the plurality of corresponding access service providers.

3. The method according to claim 2, wherein the identified video layer information comprises a number of required layers and corresponding video formats for the layered video service.

4. The method according to claim 3, wherein the video formats comprise 720P60, 1080i60 or 1080P60.

5. The method according to claim 4, wherein the at least one network access service provider performs scalable coding to generate the base layer video and the enhancement layer videos for the layered video service based on the communicated identified video layer information.

6. The method according to claim 5, wherein the generated base layer video is decodable by the plurality of devices, and the generated enhancement layer videos are selectively decodable by the plurality of devices.

7. The method according to claim 6, wherein the at least one network access service provider communicates the generated base layer video and the generated enhancement layer videos to the broadband gateway over the at least one physical layer connection.

8. The method according to claim 7, further comprising selecting the subset of enhancement layer videos for the individual one of the plurality of devices based on corresponding video decoding capabilities and power profile of the individual one of the plurality of devices.

9. The method according to claim 8, comprising providing different subsets of the enhancement layer videos and the communicated base layer video to multiple ones of the plurality of devices.

10. The method according to claim 9, wherein the plurality of devices decode the provided respective different subsets of the enhancement layer videos and the communicated base layer video for the layered video service.

11. A system for networking, the system comprising:
one or more circuits of a broadband gateway that enables communication with a plurality of devices, wherein the broadband gateway is operable to handle at least one physical layer connection to at least one corresponding network access service provider, the one or more circuits of the broadband gateway being operable to:
identify video layer information required for a layered video service based on video decoding capabilities or power profiles of the plurality of devices;
communicate the identified video layer information to the at least one network access service provider, the identified video layer information including an indication of enhancement layer videos;
receive, from the at least one network access service provider, a base layer video and the enhancement layer videos for the layered video service, wherein the base layer video and the enhancement layer videos are determined based on the communicated identified video layer information; and
selectively provide, by the broadband gateway, the received base layer video and a subset of the received enhancement layer videos to an individual one of the plurality of devices based on respective video decoding capabilities or a power profile of the individual one of the plurality of devices.

12. The system according to claim 11, wherein the at least one physical layer connection comprises a plurality of physical layer connections and the at least one corresponding network access service provider comprises a plurality of corresponding access service providers, and wherein each of the plurality of physical layer connections corresponds to a respective one of the plurality of corresponding access service providers.

13. The system according to claim 12, wherein the identified video layer information comprises a number of required layers and corresponding video formats for the layered video service.

14. The system according to claim 13, wherein the video formats comprise 720P60, 1080i60 or 1080P60.

15. The system according to claim 14, wherein at least one network access service provider performs scalable coding to generate the base layer video and the enhancement layer videos for the layered video service based on the communicated identified video layer information.

16. The system according to claim 15, wherein the generated base layer video is decodable by the plurality of devices, and the generated enhancement layer videos are selectively decodable by the plurality of devices.

17. The system according to claim 16, wherein the at least one network access service provider communicates the generated base layer video and the generated enhancement layer videos to the broadband gateway over the at least one physical layer connection.

18. The system according to claim 17, wherein the one or more circuits are operable to select the subset of enhancement layer videos for the individual one of the plurality of devices based on corresponding video decoding capabilities and power profile of the individual one of the plurality of devices.

19. The system according to claim 18, wherein the one or more circuits are operable to provide different subsets of the enhancement layer videos and the communicated base layer video to multiple ones of the plurality of devices.

20. The system according to claim 19, wherein the plurality of devices decode the provided respective different subsets of the enhancement layer videos and the communicated base layer video for the layered video service.

21. A non-transitory computer-readable medium having program instructions that cause a hardwire processor of a broadband gateway to:
identify, by the broadband gateway, video layer information required for a layered video service based on video decoding capabilities or power profiles of a plurality of devices communicatively coupled to the broadband gateway;
communicate, by the broadband gateway, the identified video layer information to the at least one network access service provider, the identified video layer information comprises a number of enhancement layer videos;
receive, from the at least one network access service provider, a base layer video and the enhancement layer videos for the layered video service, wherein the base layer video and the enhancement layer videos are determined based on the communicated identified video layer information; and selectively provide, by the broadband gateway, the received base layer video and a subset of the received enhancement layer videos to an individual one of the plurality of devices based on respective video decoding capabilities or a power profile of the individual one of the plurality of devices.

* * * * *